(12) United States Patent
Schmitz et al.

(10) Patent No.: US 6,172,430 B1
(45) Date of Patent: Jan. 9, 2001

(54) DEVICE FOR LOCKING AND UNLOCKING A DOOR OF A MOTOR VEHICLE

(75) Inventors: Stephan Schmitz, Stuttgart; Achim Wach, Markgroeningen; Lothar Groesch, Stuttgart; Karl-Heinz Kaiser, Tamm, all of (DE)

(73) Assignee: Robert Bosch GmbH, Stuttgart (DE)

(*) Notice: Under 35 U.S.C. 154(b), the term of this patent shall be extended for 0 days.

(21) Appl. No.: 09/212,901

(22) Filed: Dec. 16, 1998

(30) Foreign Application Priority Data

Dec. 16, 1997 (DE) ............................................. 197 55 770

(51) Int. Cl.⁷ .................................................... B60R 25/10
(52) U.S. Cl. ..................... 307/10.2; 307/10.4; 307/10.5; 180/287; 340/825.72
(58) Field of Search ................................. 307/10.2, 10.4, 307/10.5; 180/287; 340/825.09, 426, 825.72

(56) References Cited

U.S. PATENT DOCUMENTS

| | | | |
|---|---|---|---|
| 4,940,964 | * 7/1990 | Dao ................................. | 340/825.69 |
| 5,616,966 | * 4/1997 | Fischer et al. ....................... | 307/10.5 |
| 5,708,307 | * 1/1998 | Iijima et al. ......................... | 307/10.5 |
| 5,736,793 | * 4/1998 | Jahrsetz et al. ...................... | 180/287 |

OTHER PUBLICATIONS

Motoki Hirano et al., "Keyless Entry System with Radio Card Transponder," IEEE Transactions on Industrial Electronics, vol. 35, 1988, pp. 208–216.

* cited by examiner

*Primary Examiner*—Albert W. Paladini
(74) *Attorney, Agent, or Firm*—Kenyon & Kenyon

(57) ABSTRACT

A device for locking and unlocking a door of a motor vehicle. The device includes a transmitting unit located on the motor vehicle and at least one transponder with an access authorization code assigned to a user. To allow flexible adjustment to different situations, the information exchanged between the transmitting unit and transponder contains not only an access authorization code but also a driving authorization code. In addition to the transponder, at least one additional storage device is provided in or on the vehicle for storing the driving authorization.

14 Claims, 3 Drawing Sheets

DEVICE FOR LOCKING AND UNLOCKING A DOOR OF A MOTOR VEHICLE

FIELD OF THE INVENTION

The present invention relates to a device for locking and unlocking a door of a motor vehicle. The device includes a transmitting unit located on the vehicle and at least one transponder with an access authorization code assigned to a user.

BACKGROUND INFORMATION

A device for locking and unlocking a door without a key is described in "Keyless Entry System with Radio Card Transponder," Motoki Hirano et al., IEEE Transactions on Industrial Electronics, Vol. 35, 1988, pages 208 through 216. This conventional device is used to unlock a locked door of a motor vehicle as soon as a user carrying a transponder enters the interrogation field of a transmitting unit located in the door region, triggering interrogation. The door is unlocked when the transmitting unit detects the correct transponder code, using an evaluator.

Although it is not difficult for the user to lock and unlock the door using such a device, situations can arise in which the mode of operation of this device is disadvantageous, making it less attractive to users. For example, it is possible to start a vehicle if an unauthorized user gains access to the car's interior.

SUMMARY OF THE INVENTION

An object of the present invention is to provide a device which offers greater security against unauthorized use of the vehicle and supports the user in a variety of real situations.

According to this arrangement, the information exchanged between the transmitting unit and transponder contains not only the access authorization code but also a driving authorization code, and, in addition to the transponder, at least one more storage device is provided in or on the vehicle for storing the driving authorization.

The access authorization code makes it possible to gain access to the vehicle interior without allowing the vehicle to be driven away. The vehicle can be driven away only if a driving authorization is also detected. Storing the authorization data in the additional storage device makes it possible to continuously check the authorization status and also the presence of the transponder, enabling the system to respond to changes in the situation. The controller can be programmed to detect and take into account many different situations and trigger a suitable response in each one.

If interrogation of the driving authorization code is not triggered and evaluated by a controller until access authorization is detected based on the access authorization code, and if the driving authorization is stored in the additional storage device when this code is detected through evaluation by an evaluating stage of the controller, driving authorization will not be granted at all unless access authorization is also present.

According to advantageous refinements, the additional storage device is an emergency card or a storage area and is or can be placed in a roof-mounted module or the controller. The storage device designed as the emergency card can be removed if desired, preventing manipulation of the additional storage device. To simplify the design, the additional storage device can also be provided as a storage area in a roof-mounted module or the controller.

A time window for checking the driving authorization, thus providing additional security, is obtained by having the controller trigger interrogation of the driving authorization code before or shortly after starting the vehicle.

To support secure operation and help increase security against unauthorized operation, the driving authorization remains stored in the additional storage device when the transponder moves out of range of a driving authorization code receiving zone while the vehicle is moving, and the driving authorization is removed from the additional storage device when the vehicle and engine are stopped.

For example, to alert the driver to the fact that the transponder is no longer within the interrogation or receiving zone, an acoustic and/or optical indicator connected to the controller is provided which can be used to indicate when the transponder leaves the receiving zone of the driving authorization code.

A further important item of information for the user is provided by the ability to indicate when the driver has gotten out of a stationary car and left at least one transponder inside the vehicle, in which case the doors will not lock. This ensures that an authorized user does not leave the transponder behind, making it accessible to an unauthorized person.

According to an embodiment of the operating concept, an internal card can be disabled automatically if the user always wants the doors to be locked. The doors are locked by a deliberate action ("tapping on the door").

Security can be further increased by allowing the door to be locked only when the emergency card is removed from its holder.

To prevent a transponder from being locked in the car trunk by mistake, the trunk door cannot be locked after it has been unlocked and a transponder left in the trunk. The driver can also be alerted to this by an acoustic/optical device.

Because interrogation of the driving authorization code cannot be triggered if the vehicle is entered without access authorization, the vehicle cannot be driven away when it is entered by an unauthorized person.

To enable the vehicle to be driven away from a hazardous zone in dangerous situations, the controller can allow the vehicle to be driven a short distance even without driving authorization, in which case a warning device is activated. To prevent the vehicle from being driven a long distance unauthorized, the distance becomes shorter after the engine is turned off and then started again. Each time the car is restarted, the distance that can be covered is much shorter than the distance covered the last time. Such special situations are indicated externally by an acoustic/optical device.

To allow simple operation in combination with the transponder, the vehicle can be started and the steering column lock released by pressing the brake pedal while simultaneously pulling a knob on the gear shift level, and the engine can be turned off by pressing a button or turning a rotary switch.

To ensure smooth vehicle operation, the stored driving authorization is erased when changing drivers and, if the new driver does not have a transponder, the system switches over to interrogation of the passenger transponder.

DETAILED DESCRIPTION

Figure 1:
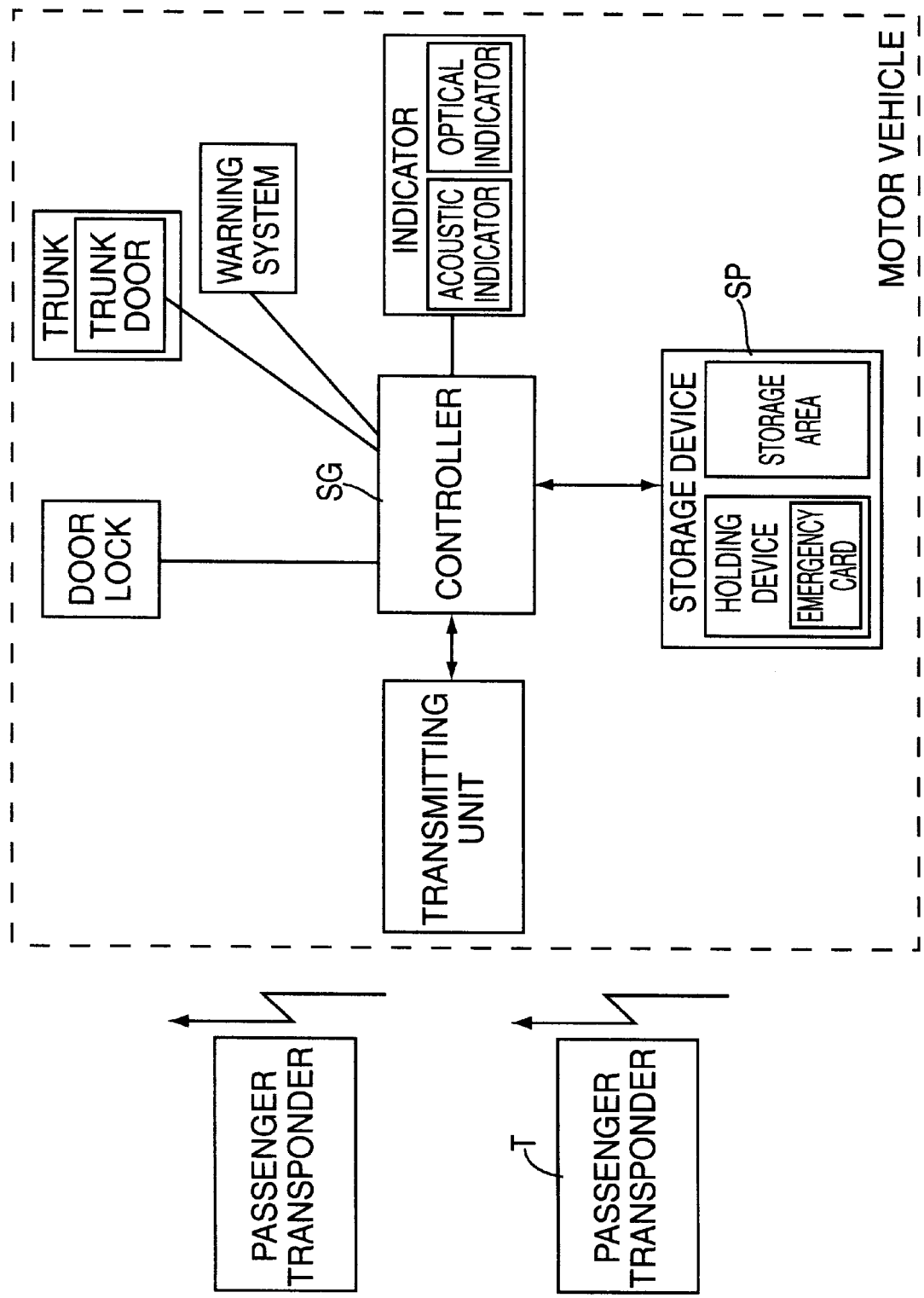
FIG. 1 shows a block diagram illustrating an embodiment of a device for locking and unlocking a door of a motor vehicle according to the present invention.
Figure 2:
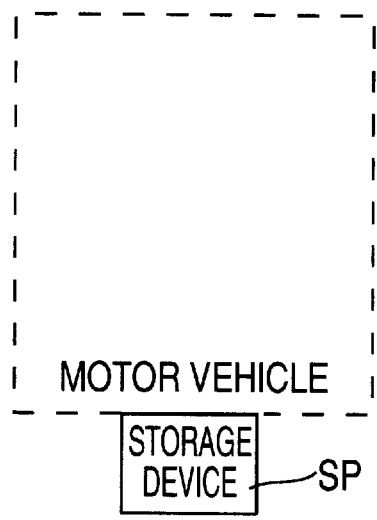
FIG. 2 shows a block diagram illustrating a portion of an embodiment of the device for locking and unlocking the door of the motor vehicle according to the present invention.

As shown in the FIG. 1, a responder T in the form of a transponder assigned to a user carries information that can be interrogated by a transmitting unit located on the motor vehicle as soon as transponder T comes within range of a transmitting unit S located on the motor vehicle. Transmitting unit S is connected to a controller SG, to which is connected another unit SP in the form of a storage device SP in addition to transponder. The storage device SP may be situated in the motor vehicle or on the motor vehicle (FIG. 2). Controller SG has a number of different stages which can be used to evaluate the data supplied by transmitting unit S and storage device SP and trigger suitable responses which, for example, can be assigned to different situations by a programming unit in the controller.

Figure 3:
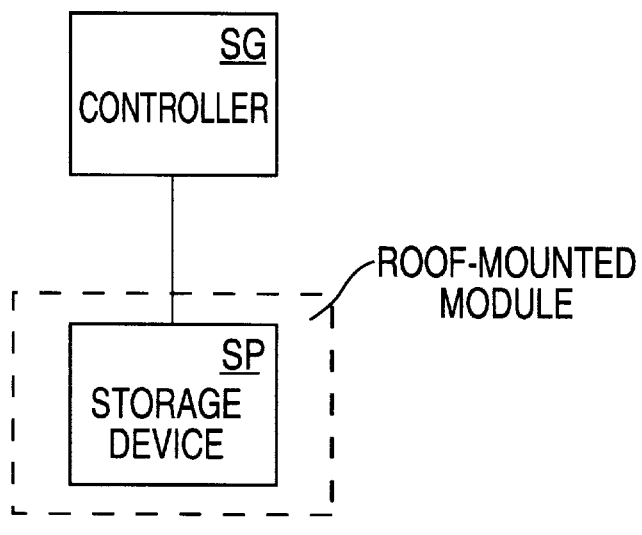
FIG. 3 shows a block diagram illustrating a portion of an embodiment of the device for locking and unlocking the door of the motor vehicle according to the present invention.
Figure 4:
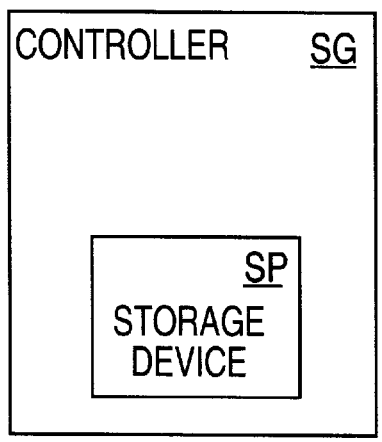
FIG. 4 shows a block diagram illustrating a portion of an embodiment of the device for locking and unlocking the door of the motor vehicle according to the present invention.

The additional storage device can be in the form of an emergency card or a storage area and be placed in a roof-mounted module (FIG. 3) or in controller SG (FIG. 4), for example near an instrument assembly or the dashboard. Interrogation of transponder T is advantageously initiated by a trigger unit which is located in the motor vehicle door handle and responds when the door handle is operated.

In addition to an access authorization code, the information stored in transponder T also contains a driving authorization code, with the system initially checking only the access authorization code when interrogation is triggered and unlocking the door if controller SG detects the access authorization code, depending on the programming of controller SG. The driving authorization code is checked before or shortly after starting the vehicle and stored temporarily in the additional storage device after driving authorization has been detected.

The driving authorization code remains stored if transponder T leaves the receiving zone for interrogating the driving authorization code during vehicle travel, which is detected by a speed sensor or an engine status detector, for example, if children play with transponder T or the latter falls out of a pocket. The vehicle authorization is canceled when the vehicle stops, i.e. when the engine is turned off, and it is automatically erased from storage device SP if the driver leaves transponder T behind in the vehicle.

If transponder T leaves the receiving or local zone for interrogating the driving authorization code while the vehicle is moving, this can be indicated, for example, visually or acoustically by an indicator on the roof-mounted module. If the driver leaves the stopped vehicle, a dual-tone warning signal sounds when the vehicle door closes, alerting him to the fact that he has left transponder T behind. The doors do not lock in this case. Controller SG can be programmed so that the doors can be locked only if the driver has removed the emergency card from its holder.

The presence of at least one transponder T in the vehicle after the driver leaves the vehicle is indicated by an acoustic or optical signal when the door closes. The door does not lock automatically if at least one transponder is located in the vehicle. If, however, no transponder T is in the vehicle, the doors are locked.

If the trunk is unlocked by bringing transponder T into a local "trunk" zone, and if the user with access authorization opens the trunk and leaves transponder T inside it, the trunk door will not lock when it is closed.

If an unauthorized person illegally enters the vehicle without access authorization while the doors are locked, checking of the driving authorization code is not enabled. If a card is present, it is disabled.

To remove a vehicle from a hazardous zone in an emergency situation, the vehicle can be started without driving authorization and driven a short, programmable distance (such as 50 meters). A special situation of this type (such as stopping at a railway crossing or an accident) is indicated to the surroundings by an audible horn signal and/or activation of the hazard warning lights or flashing low-beam lights. If a vehicle stalls in a situation of this type, it can be started again after a programmable period of time, such as 5 seconds. If the engine stalls again, the time period can be extended and/or the distance cut in half.

Figure 5:
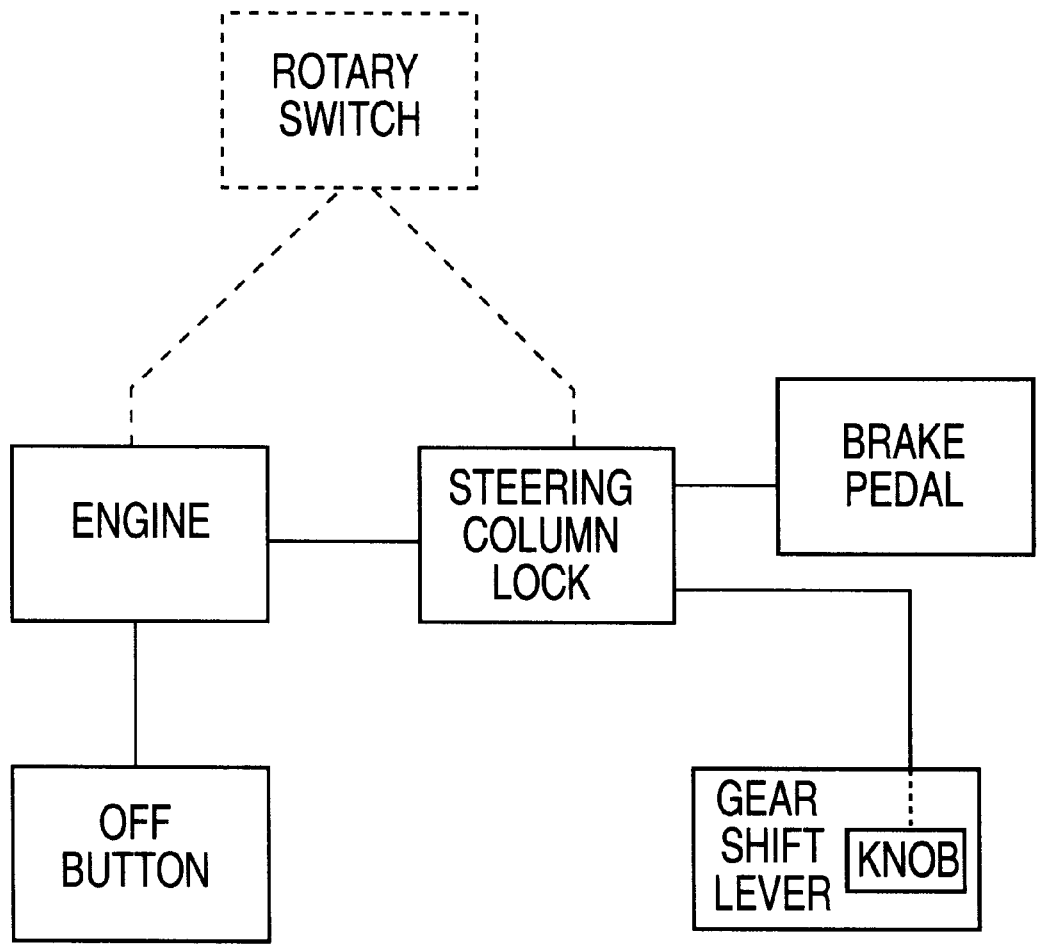
FIG. 5 shows a block diagram illustrating a portion of an embodiment of the device for locking and unlocking the door of the motor vehicle according to the present invention.

In FIG. 5, the vehicle can be started and the steering column lock released by pressing the brake pedal while simultaneously pulling a knob on the gear shift lever or turning a rotary switch. The engine can be turned off by either pressing a button located, for example, on the steering wheel, or turning a rotary switch.

If the driver changes places with the passenger, turning off the engine while doing so, the driving authorization is canceled. If the passenger does not have a transponder T with a driving authorization code, the system looks for the previous transponder T in the passenger's vicinity after he switches with the driver and grants driving authorization to the new driver if it detects the correct driving authorization code.

The device embodiment described above can be used to adjust the latter flexibly to real situations.

What is claimed is:

1. A device for locking and unlocking a door of a motor vehicle, comprising:
    a transmitting unit situated on the motor vehicle;
    at least one transponder having an access authorization code assigned to a user, the at least one transponder exchanging the access authorization code and a driving authorization code with the transmitting unit;
    at least one storage device storing a driving authorization, the at least one storage device being situated one of in the motor vehicle and on the motor vehicle; and
    a controller coupled to the transmitting unit and to the at least one storage device, the controller controlling a door lock.

2. The device according to claim 1,
    wherein the controller monitors at least one of whether the user leaves the motor vehicle, whether the motor vehicle is moving and whether the at least one transponder is left inside of the motor vehicle, and
    wherein, when the user leaves the motor vehicle which is not moving and leaves the at least one transponder inside of the motor vehicle, the controller prevents at least one door of the motor vehicle from being locked.

3. The device according to claim 1,
    wherein the controller monitors at least one of whether the at least one transponder is left in a trunk of the motor vehicle and whether a trunk door of the trunk is unlocked, and
    wherein, after the trunk door is unlocked and the at least one transponder is left in the trunk, the trunk door cannot be locked and the device provides one of an acoustical indication signal and an optical indication signal.

4. The device according to claim 1, wherein the motor vehicle is started and a steering column lock of the motor vehicle is released by pressing a brake pedal of the motor vehicle while simultaneously one of pulling a knob on a gear shift lever and turning a rotary switch, an engine of the motor vehicle being turned off by one of pressing a button and turning the rotary switch.

5. The device according to claim 1,
wherein the controller triggers and evaluates an interrogation of the driving authorization code after an access authorization is detected as a function of the access authorization code, and
wherein the at least one storage device stores the driving authorization when the driving authorization is detected by an evaluating procedure of the controller.

6. The device according to claim 5, wherein the interrogation of the driving authorization code is triggered by the controller before or shortly after starting the motor vehicle, the controller monitoring the starting of the motor vehicle.

7. The device according to claim 2,
wherein the driving authorization code includes information regarding a receiving zone,
wherein the controller monitors whether at least one of the motor vehicle is moving, the motor vehicle is stopped and an engine of the motor vehicle is stopped;
wherein, when the at least one transponder is moved out of a predetermined range of the receiving zone, the driving authorization remains stored in the at least one storage device while the motor vehicle is moving, and
wherein, when the motor vehicle and the engine of the motor vehicle stop, the driving authorization is removed from the at least one storage device by the at least one storage device.

8. The device according to claim 5, further comprising:
an indicator coupled to the controller, the controller monitoring whether the at least one transponder has left a receiving zone, the indicator indicating when the at least one transponder has left the receiving zone, the driving authorization code including information relating to the receiving zone, the indicator including at least one of an acoustic indicator and an optical indicator.

9. The device according to claim 5,
wherein the controller determines if a person without access information enters the motor vehicle, and
wherein the interrogation of the driving authorization code cannot be triggered by the controller if the person without access information enters the motor vehicle.

10. The device according to claim 5, wherein the stored driving authorization is canceled after the user is substituted with a further user, the controller interrogating a passenger transponder of the at least one transponder if the further user does not have a particular transponder of the at least one transponder.

11. The device according to claim 5, wherein the at least one storage device includes one of an emergency card and a storage area, the at least one storage device being situated in one of a roof-mounted module and the controller.

12. The device according to claim 11,
wherein the at least one storage device includes a holding device, the holding device housing the emergency card, and
wherein the door lock can be locked via the controller only if the emergency card is removed from the holding device.

13. The device according to claim 5, further comprising:
a sensor coupled to the controller, the sensor being in communication with the controller with information relating to a distance being driven by the motor vehicle,
wherein, when an emergency situation arises, the controller allows the motor vehicle to be driven a predetermined distance without the driving authorization and activates a warning system.

14. The device according to claim 13,
wherein the controller monitors a state of an engine of the motor vehicle, and
wherein the predetermined distance is shortened after the engine stops and then is started again.

* * * * *